(12) United States Patent
Schoner

(10) Patent No.: US 6,954,114 B2
(45) Date of Patent: Oct. 11, 2005

(54) NCO WITH RATIONAL FREQUENCY AND NORMALIZED PHASE

(75) Inventor: Brian Schoner, Fremont, CA (US)

(73) Assignee: Broadcom Corporation, Irvine, CA (US)

(*) Notice: Subject to any disclaimer, the term of this patent is extended or adjusted under 35 U.S.C. 154(b) by 279 days.

(21) Appl. No.: 10/133,461

(22) Filed: Apr. 26, 2002

(65) Prior Publication Data
US 2003/0201840 A1 Oct. 30, 2003

(51) Int. Cl.[7] .................................................. H03B 1/00
(52) U.S. Cl. ................................. 331/177 R; 331/179
(58) Field of Search ..................... 331/1 A, 74, 177 R, 331/179; 327/105, 106, 107

(56) References Cited

U.S. PATENT DOCUMENTS

| | | | | |
|---|---|---|---|---|
| 5,425,055 A | * | 6/1995 | Blaker | ......................... 375/279 |
| 5,521,534 A | * | 5/1996 | Elliott | ......................... 327/129 |
| 5,612,975 A | * | 3/1997 | Becker et al. | ............... 375/319 |
| 5,748,677 A | * | 5/1998 | Kumar | ......................... 375/285 |
| 5,808,493 A | * | 9/1998 | Akiyama et al. | ............ 327/159 |

OTHER PUBLICATIONS

P.V. Brennan, "*Phase–Locked Loops*">>, 1996, pp. 1–204; Published by McCraw–Hill.

* cited by examiner

*Primary Examiner*—Henry Choe
(74) *Attorney, Agent, or Firm*—McAndrews, Held & Malloy, Ltd.

(57) ABSTRACT

A numerically controlled oscillator (NCO) system for generating rational frequencies with normalized phase is disclosed. In one embodiment, the system comprises a rational NCO and a simple NCO. The rational NCO generates an overflow or correction value, based on a desired rational frequency of the system, and the simple NCO uses the overflow or correction value to generate the desired rational frequency.

57 Claims, 6 Drawing Sheets

NCO WITH RATIONAL FREQUENCY AND NORMALIZED PHASE

CROSS-REFERENCE TO RELATED APPLICATIONS

N/A

FEDERALLY SPONSORED RESEARCH OR DEVELOPMENT

N/A

MICROFICHE/COPYRIGHT REFERENCE

N/A

BACKGROUND OF THE INVENTION

Numerically controlled oscillators (NCOs) are common digital circuits, and are used in a wide range of timing applications. Such timing applications may include, for example, frequency synthesis, rate conversion and clock generation.

One prior art digital NCO comprises a digital accumulator with overflow. This type of NCO may generally be called a simple NCO, for example. In a simple NCO, a digital control word, C, is repeatedly added to a binary N-bit accumulator. The accumulator periodically overflows (i.e., whenever the accumulator reaches b $2^N$), and the overflow can be used, for example, to generate an output occurrence in a timing application. Assuming that the digital control word C is less than $2^N$, the average frequency of the accumulator overflow in a simple NCO is:

$$f = \frac{C}{2^N} \cdot (\text{accumulator\_clock})$$

For example, if the (decimal) value 100 is added to an 8-bit accumulator at 1 MHz, the average NCO frequency will be (100×1 MHz/256)=390625 Hz.

One example of a simple NCO is the Harris Semiconductor HSP45102.

Oftentimes in timing applications, an NCO is required to have a rational frequency. Specifically, as mentioned above, a simple NCO overflows when the accumulator reach $2^N$. With some additional logic, a simple NCO accumulator can be modified so that it overflows at an arbitrary integer, B, for example. In this case, the NCO then has a rational frequency of C/B. Assuming that C is less than B, the average frequency of the NCO accumulator then becomes:

$$f = \frac{C}{B} \cdot (\text{accumulator\_clock})$$

This type of prior art NCO may be called a rational NCO, for example.

NCO's are often required to provide a binary fractional output normalized to the range [0,1) for use in computations, or table look ups, for example. A simple NCO provides this normalized output—the accumulator value can be considered an N-bit fractional binary number in the range [0,1). Problems arise, however, when a normalized, rational NCO is desired.

Specifically, a rational NCO accumulator is not a simple binary counter. To convert the rational NCO accumulator to an N-bit binary fraction, the accumulator value must be multiplied by the value ($2^N$/B). This normalization operation is problematic for several reasons. For example, multipliers are generally large and expensive digital circuits, particularly when required to run at high speed, as is often the case with NCOs. In addition, computing the value ($2^N$/B) may require a division, and dividers are also generally large and expensive digital circuits. For at least these reasons, normalizing a rational NCO generally carries a high cost, in terms of both design space and in price.

In addition to normalization, NCOs sometimes require adjustments to a current frequency and/or phase. For example, such adjustments are needed if the NCO is used in a QPSK or FM transmitter. A simple NCO enables such adjustments. Since the simple NCO accumulator is a power-of-two, it is quite easy to make phase adjustments by 90 degrees, and since the accumulator value is normalized, adjustments to the control word have consistent effects on the output frequency. Again, however, problems arise when a rational NCO is desired, because such phase adjustments are rather difficult on a rational NCO. Phase adjustments of rational NCOs therefore also carry a high cost, again in terms of both design space and in price, due also to the multiplication required.

Prior art has attempted to avoid the multiplication required in these cases by building a simple NCO with very large accumulators and control words. For example, the Harris HSP 45102 mentioned above only has a 12-bit output, but the accumulator and control word are 32-bits. The extra 20-bits of precision allow the simple NCO to approximate rational values. For example, the 32-bit control word can approximate the rational value ⅓ to about 1 part per billion. Although the simple NCO approximation to ⅓ may be very accurate, it is not exact. In addition, such an NCO will drift over time. For some applications, this drift is not acceptable.

Further limitations and disadvantages of conventional and traditional approaches will become apparent to one of skill in the art, through comparison of such systems with the present invention as set forth in the remainder of the present application with reference to the drawings.

SUMMARY OF THE INVENTION

Aspects of the present invention may be found in a numerically controlled oscillator (NCO) system having first NCO circuitry and second NCO circuitry. The first NCO circuitry, which may comprise a rational NCO for example, generates an overflow value. The second NCO circuitry, which may comprise a simple NCO, for example, generates a sequence of numbers, adds the overflow value from the first NCO circuitry to one or more of the numbers in the sequence, and outputs the resulting sequence of numbers.

In one embodiment, the first NCO circuitry generates the overflow value periodically based on the desired rational frequency of the system. For example, the first NCO circuitry generates the overflow value during each of multiple cycles of system operation, and the second NCO circuitry adds the overflow value to a certain number or numbers generated during such cycles.

In an exemplary embodiment, the first NCO circuitry is programmed with first information that is calculated using the desired rational frequency of the system. The first information may then be used to generate the overflow value. The second NCO circuitry is likewise programmed with second information that is calculated using the desired rational frequency, and uses the second information and the overflow value to generate the desired rational frequency.

For example, if the desired rational frequency is represented by the ratio C/B, the first and second information may be determined using the following equation $$\frac{C}{B} = \frac{\text{int}\left(\frac{2^N * C}{B}\right)}{2^N} + \frac{\text{rem}\left(\frac{2^N * C}{B}\right)}{2^N} = \frac{X}{2^N} + \frac{\left(\frac{Y}{B}\right)}{2^N}$$

with the first information comprising values for Y and B and the second information comprising a value for X.

In an exemplary implementation, the first NCO circuitry accumulates a first input value (e.g., Y) and generates the overflow value (e.g., the integer 1) when an accumulation result is greater than a second input value (e.g., B). The second NCO circuitry accumulates a third input value (e.g., X) and outputs a 0 and 1 when a combination of the accumulation result and the overflow value itself results in an overflow condition. In this implementation, the first and second NCO circuitry may comprise, for example, first and second digital accumulators.

Aspects of the present invention may also be found in a system having a first NCO that generates a correction value based on a desired rational frequency, and a second NCO that generates the desired rational frequency using the correction value.

In any given embodiment, the system is capable of generating an output that is normalized to the range [0, 1).

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1:
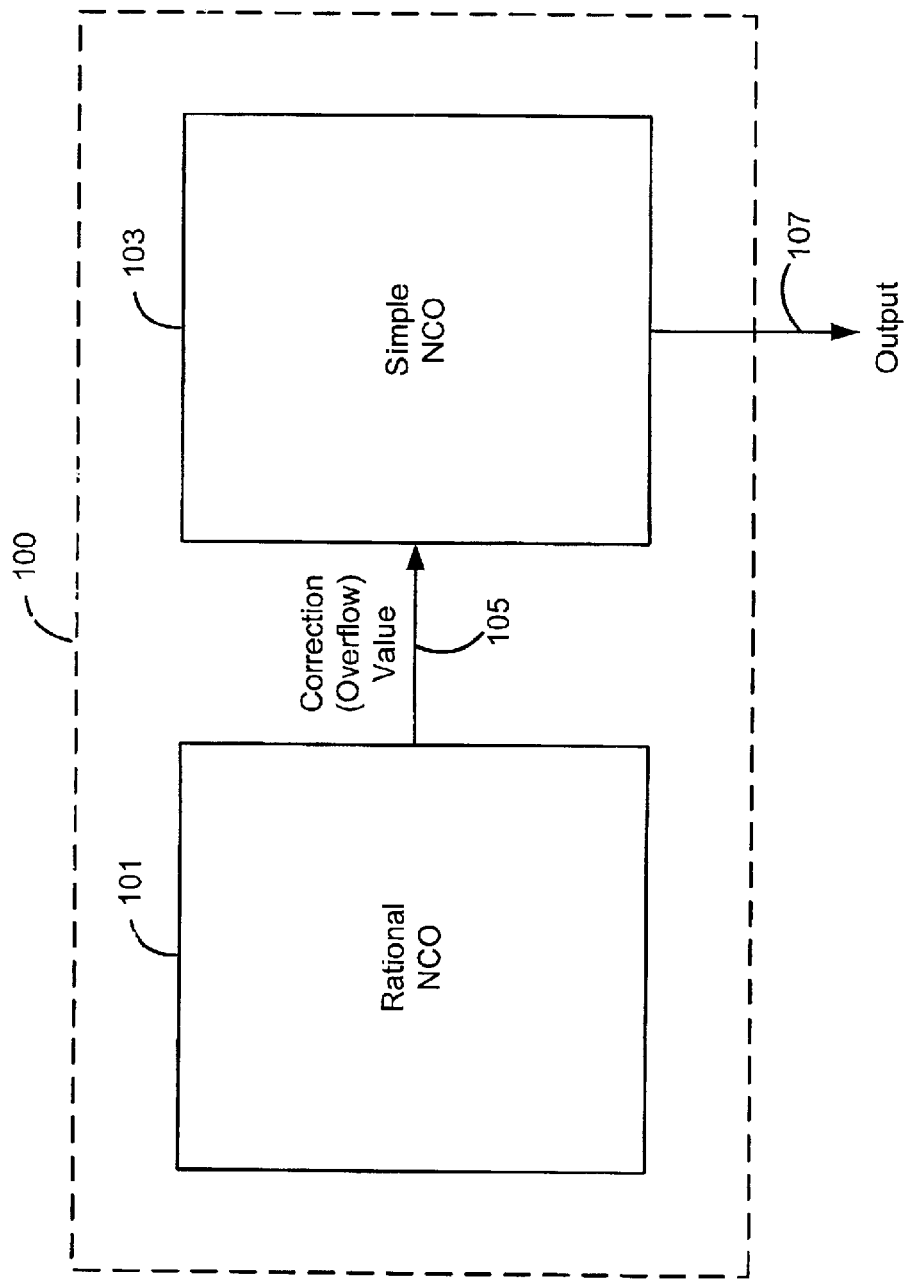
FIG. 1 illustrates a generic block diagram of an NCO or NCO system in accordance with one embodiment of the present invention.

FIG. 1 illustrates a generic block diagram of an NCO or NCO system in accordance with one embodiment of the present invention. NCO system 100 generally comprises a combination of a rational NCO 101 and a simple NCO 103. Rational NCO 101 generates a correction or overflow value 105 that is fed to simple NCO 103. Simple NCO 103 uses the correction or overflow value 105 in connection with generating an output 107. The output 107 generally comprises a binary output having a rational frequency and a normalized phase.

More specifically, in accordance with the present invention, any desired rational frequency or fraction, C/B for example, is re-written as the sum of two fractions:

$$\frac{C}{B} = \frac{\text{int}\left(\frac{2^N * C}{B}\right)}{2^N} + \frac{\text{rem}\left(\frac{2^N * C}{B}\right)}{2^N} = \frac{X}{2^N} + \frac{\left(\frac{Y}{B}\right)}{2^N}$$

The first fraction, $X/2^N$, is a simple NCO approximation to C/B, and corresponds to simple NCO 103 of FIG. 1, for example. The second fraction, $(Y/B)/2^N$, is a rational NCO, such as rational NCO 101 of FIG. 1 for example, that provides a small correction to the simple NCO. This correction generally keeps the simple NCO from drifting.

The simple NCO provides an N-bit binary output normalized to the range [0,1). The output can easily be extended to any desired accuracy. In addition, the simple NCO accumulator can be easily adjusted for phase or frequency modulation.

Referring again to the equation above, to create for example an NCO having a frequency of 2/9 and a 4-bit normalized output, the equation reads:

$$\frac{C}{B} = \frac{2}{9} = \frac{\text{int}\left(\frac{2^4 * 2}{9}\right)}{2^4} + \frac{\text{rem}\left(\frac{2^4 * 2}{9}\right)}{2^4} = \frac{3}{16} + \frac{\left(\frac{5}{9}\right)}{16}$$

The cycle-by-cycle operation of this NCO is summarized in the following table:

| Rational NCO with f = 5/9 | Simple NCO with f = 3/16 + overflow from rational NCO | 4-bit normalized output (decimal) |
|---|---|---|
| 0/9 | 0/16 | 0 |
| 5/9 | 3/16 | 3 |
| 1/9 (overflow) | 6/16 + 1/16 = 7/16 | 7 |
| 6/9 | 10/16 | 10 |
| 2/9 (overflow) | 13/16 + 1/16 = 14/16 | 14 |
| 7/9 | 1/16 (*overflow) | 1 |
| 3/9 (overflow) | 4/16 + 1/16 = 5/16 | 5 |
| 8/9 | 8/16 | 8 |
| 4/9 (overflow) | 11/16 + 1/16 = 12/16 | 12 |
| 0/9 (overflow) | 15/16 + 1/16 = 0/16 (*overflow) | 0 |
| 5/9 | 3/16 | 3 |
| 1/9 (overflow) | 6/16 + 1/16 = 7/16 | 7 |
| 6/9 | 10/16 | 10 |
| 2/9 (overflow) | 13/16 + 1/16 = 14/16 | 14 |
| 7/9 | 1/16 (*overflow) | 1 |
| 3/9 (overflow) | 4/16 + 1/16 = 5/16 | 5 |

The first column of the table generally corresponds to the second fraction, (5/9)/16, and represents the operation of the rational NCO having a frequency of 5/9. In other words, the rational NCO overflows 5 times every 9 cycles (as can be seen from the first column of the table).

The second column of the table generally corresponds to the first fraction, 3/16, and represents the operation of a simple NCO having a frequency of 3/16 plus the overflow from the rational NCO. As can be seen from the second column, the output of the simple NCO overflows twice every 9 cycles.

Finally, as can be gathered from the third column of the table, the NCO output is 4-bit and normalized to the range [0,1), and has the desired frequency of 2/9.

Figure 2:
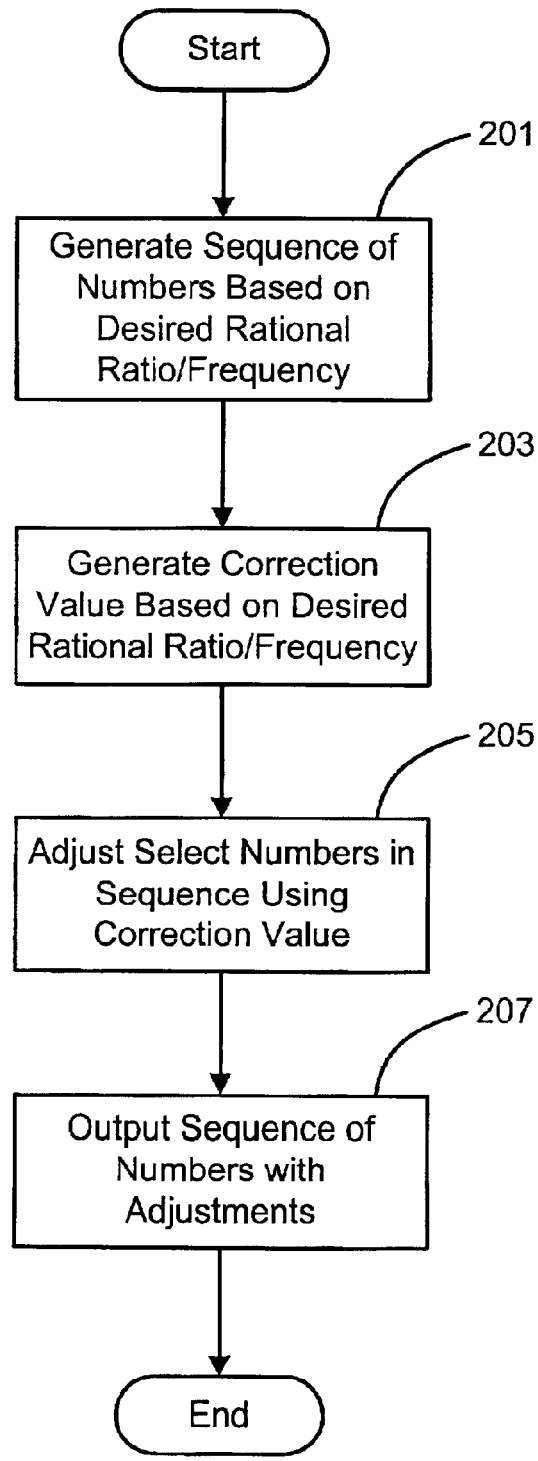
FIG. 2 is a flow diagram illustrating one embodiment of a method that may be performed in connection with the NCO system of the present invention.

FIG. 2 is a flow diagram illustrating one embodiment of a method that may be performed in connection with the NCO system of the present invention. First, a sequence of numbers, based on a desired rational ratio or frequency, is generated (step 201). This step may be performed by the simple NCO 103 of FIG. 1, for example. A correction value, also based on the desired rational ratio, is additionally generated (step 203). This step may be performed by the NCO 101 of FIG. 1, for example. Next, certain numbers in the sequence are adjusted using the correction value (step 205). For example, those numbers generated during the same cycles that the correction value is generated are adjusted. Finally, the sequence of numbers, with adjustments, is output (step 207).

Figure 3:
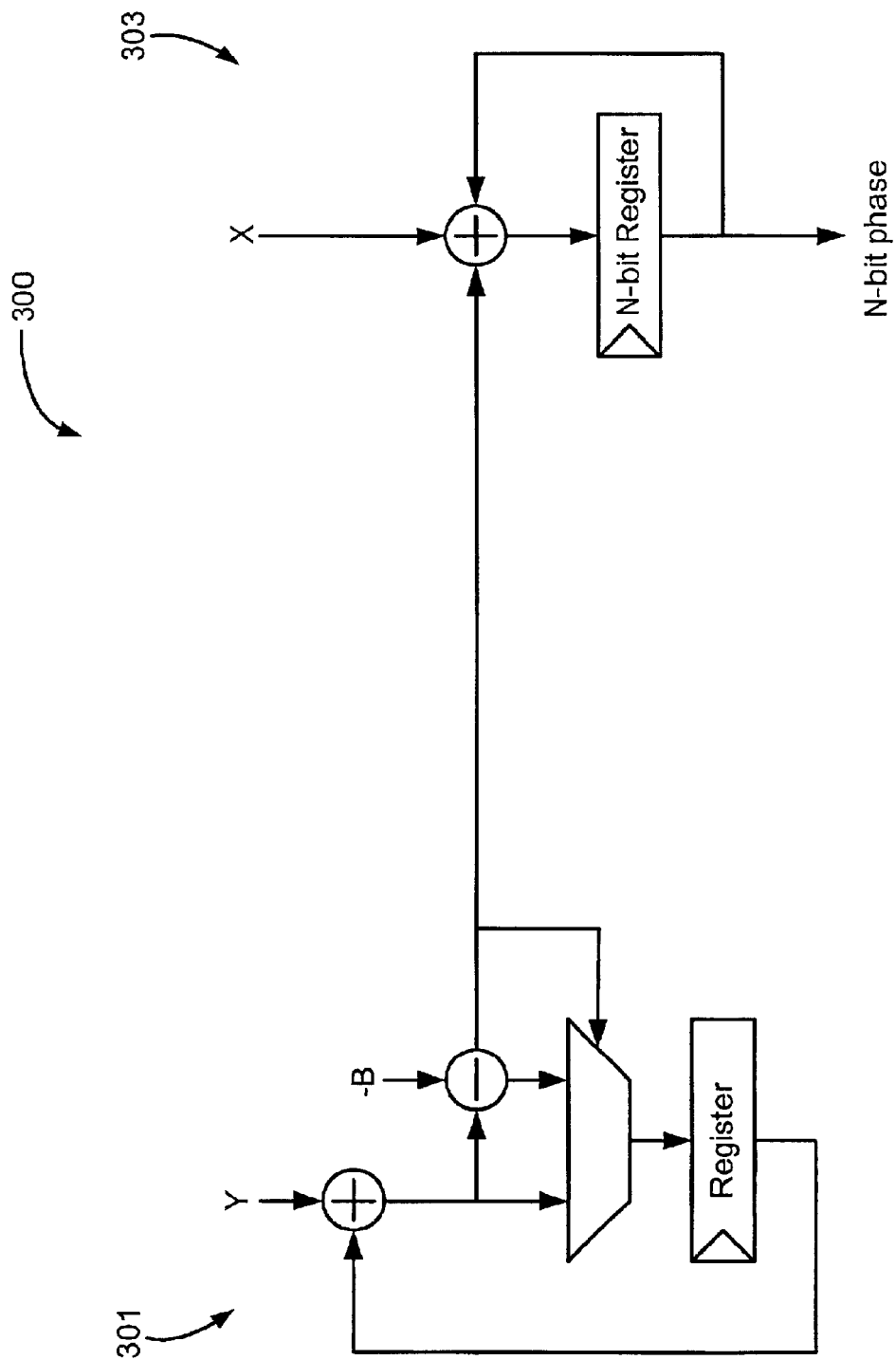
FIG. 3 illustrates an implementation of the NCO system in accordance with one embodiment of the present invention.

FIG. 3 illustrates an exemplary implementation of the NCO system is accordance with one embodiment of the present invention. To implement N-bit NCO 300 of FIG. 3, the equation discussed above is used. NCO 300 of FIG. 3 generally comprises two portions, namely, a rational NCO portion 301 and a simple NCO portion 303. In the implementation shown in FIG. 3, the rational NCO portion 301 accumulates the value of Y. If the result is greater than B, then B is subtracted from the result, and the value of 1 is added to the simple NCO portion 303. Portion 303 simply accumulates the value of X, and adds the 1 value received from portion 301. The portion 303 outputs an N-bit phase.

The implementation of FIG. 3 has several advantages. For example, it is small and simple (no multiplication or division is required), it outputs a phase that is accurate to N-bits, and it accurately represents the ratio C/B.

Figure 4:
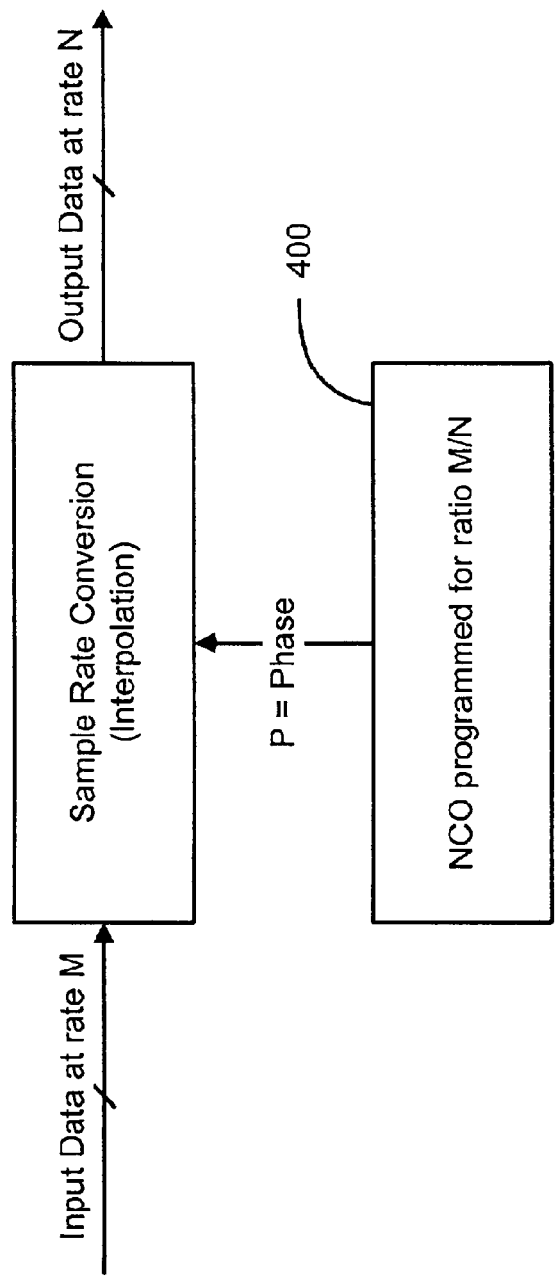
FIG. 4 is an exemplary system block diagram of a sample rate conversion application in which embodiments of the NCO system of the present invention may be used.

FIG. 4 is an exemplary block diagram of a sample rate conversion application in which the NCO of the present invention maybe used. In FIG. 4, an NCO 401 in accordance with the present invention is used to control sample rate conversion from rate M to rate N (N>M). Sample rate conversion is performed by interpolating between input samples.

For example, an output sample may be at input sample 3.279. In other words, the output sample is between input samples 3 and 4, and the output sample is closer to input sample 3 than to input sample 4. The fractional part of the output location is called the "phase," and is represented by P. The phase is equal to 0.279 in this example. As an example, a linear interpolation is: out=in4*(P)+in3*(1−P).

An example sample rate conversion using the implementation of FIG. 4 involves converting M=44.1 kHz audio to N=48 kHz audio. In this case, M/N =441/480=147/160. Assuming that the SRC requires the phase accurate to 16 bits, the operation of this system is illustrated on the timeline of FIG. 5.

Figure 5:
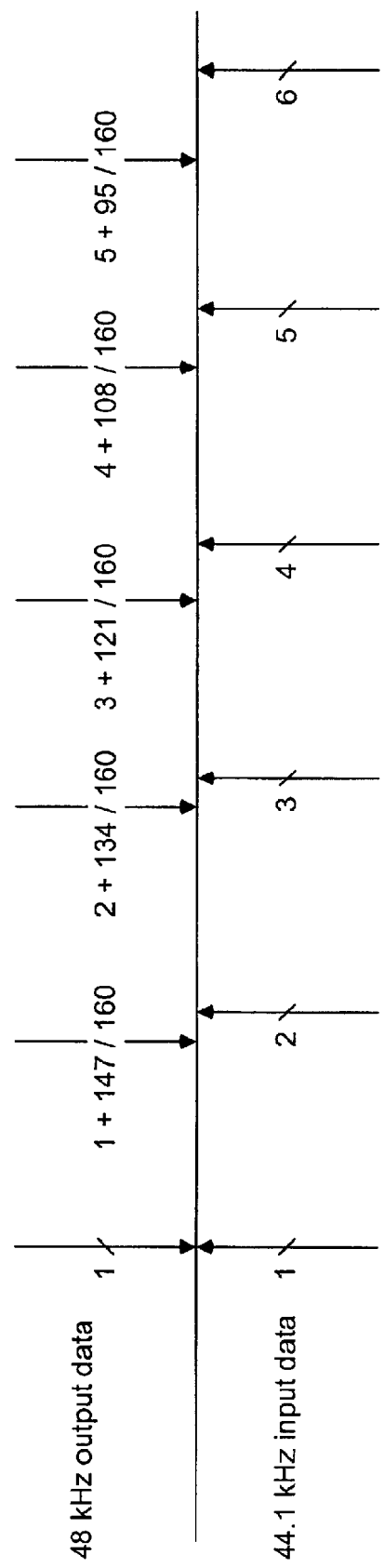
FIG. 5 is a timeline illustrating the operation of a specific sample rate conversion application in accordance with the diagram of FIG. 4.
Figure 6:
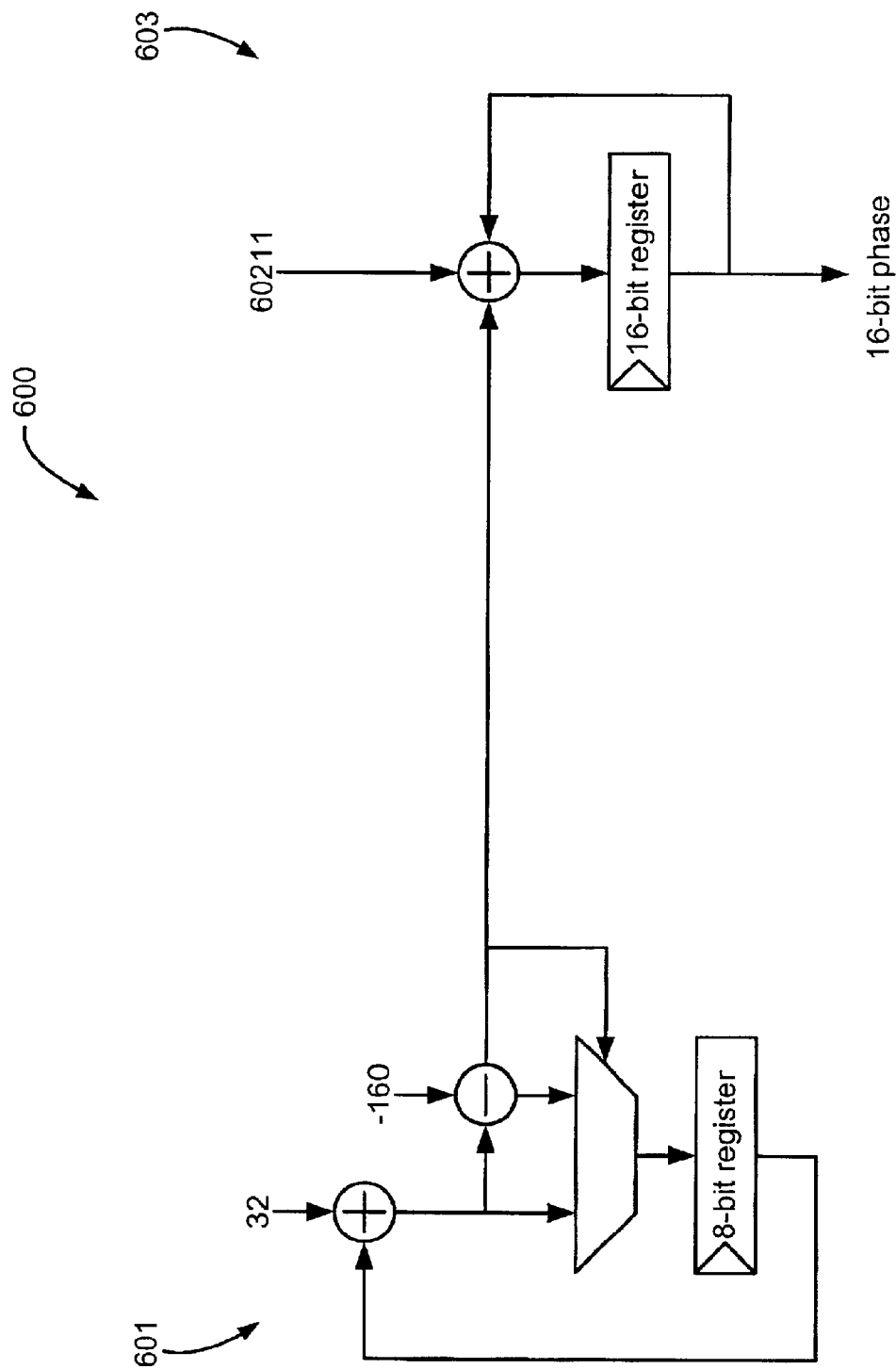
FIG. 6 illustrates an exemplary implementation of the NCO of FIG. 4, for the example illustrated in FIG. 5.

FIG. 6 illustrates an exemplary implementation of the NCO 400 of FIG. 4, for the example illustrated in FIG. 5 involving conversion of audio from an output rate of 44.1 kHz to an output rate of 48 kHz. NCO 600 of FIG. 6 corresponds to NCO 300 of FIG. 3. To implement a 16-bit NCO, the equation above is used to compute values for Y, B and X:

$$147/160=60211/65536+(32/160)/65536$$

(Note that $2^{16}$=65536). Like NCO 300 of FIG. 3, NCO 400 generally comprises two portions, namely a rational NCO portion 601 and a simple NCO portion 603. The rational NCO portion 601 accumulates the value of 32. If the result is greater than 160, then 160 is subtracted from the result, and a value of 1 (one) is added to the simple NCO portion 603. Simple NCO portion 603 simply accumulates the value of 60211, and adds the 1 value from the rational NCO 601.

NCO 600 of FIG. 6 outputs a phase that is accurate to 16 bits and accurately represents the frequency ratio 147/160 (i.e., 441/480). In addition, NCO 600 of FIG. 6 has the advantage of programmability. Specifically, for example, the input values (32, 160 and 60211) can be programmed to change the output rate.

The NCO system of the present invention is accurate to a select number of bits and does not drift over time from its expected frequency.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention include all embodiments falling within the scope of the appended claims.

What is claimed is:

1. A numerically controlled oscillator (NCO) system comprising:

first NCO circuitry that generates an overflow value at a frequency determined by a first quantitative value; and second NCO circuitry that generates a sequence of numbers, adds the overflow value from the first NCO circuitry to at least one of the sequence of numbers, and outputs a resulting sequence of numbers at a frequency determined by a second quantitative value.

2. The NCO system of claim 1 wherein the first NCO circuitry comprises a rational NCO.

3. The NCO system of claim 1 wherein the second NCO circuitry comprises a simple NCO.

4. The NCO system of claim 1 wherein the first NCO circuitry generates the overflow value periodically based on a desired rational frequency of the system.

5. The NCO system of claim 4 wherein the first NCO circuitry generates the overflow value at a frequency that is determined using the desired rational frequency of the system.

6. The NCO system of claim 1 wherein the first NCO circuitry generates the overflow value during each of a plurality of cycles of system operation, and wherein the at least one of the sequence of numbers is generated during each of the plurality of cycles of system operation.

7. The NCO system of claim 1 wherein the overflow value comprises the integer 1.

8. The NCO system of claim 1 wherein the first NCO circuitry is programmed with first information calculated using a desired rational frequency of the system.

9. The NCO system of claim 8 wherein the second NCO circuitry is programmed with second information calculated using the desired rational frequency of the system, and wherein the second NCO circuitry uses the second information and the overflow value to generate the desired rational frequency of the system.

10. The NCO system of claim 9 wherein an output is normalized to the range (0,1).

11. The NCO system of claim 9 wherein the desired rational frequency is represented by C/B and wherein the first and second information is determined using the equation $$\frac{C}{B} = \frac{\operatorname{int}\left(\frac{2^N * C}{B}\right)}{2^N} + \frac{\operatorname{rem}\left(\frac{2^N * C}{B}\right)}{2^N} = \frac{X}{2^N} + \frac{\left(\frac{Y}{B}\right)}{2^N}.$$

12. The NCO system of claim 11 wherein the first information comprises values for Y and B.

13. The NCO system of claim 11 wherein the second information comprises a value for X.

14. The NCO system of claim 1 wherein the first NCO circuitry accumulates a first input value, and generates the overflow value when an accumulation result is greater than a second input value.

15. The NCO system of claim 14 wherein the second NCO circuitry accumulates a third input value, and outputs a 0 or a 1 when a combination of an accumulation result and the overflow value itself results in an overflow.

16. The NCO system of claim 1 wherein the first and second NCO circuitry respectively comprise first and second digital accumulators.

17. A numerically controlled oscillator (NCO) system comprising:
   a first NCO that generates a correction value at a frequency determined by a first quantitative value; and
   a second NCO that generates a desired frequency determined by a second quantitative value using the correction value.

18. The NCO system of claim 17 wherein the first NCO comprises a rational NCO.

19. The NCO system of claim 17 wherein the second NCO comprises a simple NCO.

20. The NCO system of claim 17 wherein the first NCO generates the correction value at a frequency that is determined using a the desired rational frequency.

21. The NCO system of claim 14 wherein the overflow value comprises the integer 1.

22. The NCO system of claim 17 wherein the first NOC is programmed with first information calculated using a desired rational frequency.

23. The NCO system of claim 22 wherein the second NCO is programmed with second information calculated using the desired rational frequency, and wherein the second NCO uses the second information and the correction value to generate the desired rational frequency.

24. The NCO system of claim 23 wherein an output is normalized to the range [0,1).

25. The NCO system of claim 23 wherein the desired rational frequency is represented by C/B and wherein the first and second information is determined using the equation $$\frac{C}{B} = \frac{\operatorname{int}\left(\frac{2^N * C}{B}\right)}{2^N} + \frac{\operatorname{rem}\left(\frac{2^N * C}{B}\right)}{2^N} = \frac{X}{2^N} + \frac{\left(\frac{Y}{B}\right)}{2^N}.$$

26. The NCO system of claim 25 wherein the first information comprises values for Y and B.

27. The NCO system of claim 25 wherein the second information comprises a value for X.

28. The NCO system of claim 17 wherein the first NCO accumulates a first input value, and generates the correction value when an accumulation result is greater than a second input value.

29. The NCO system of claim 28 wherein the second NCO outputs a 0 or a 1 when a combination of an accumulation result and an overflow value results in an overflow.

30. The NCO system of claim 17 wherein the first and second NCOs respectively comprise first and second digital accumulators.

31. A method of operating a numerically controlled oscillator (NCO) comprising:
   generating a sequence of numbers based on a desired rational frequency;
   generating a correction value at a first frequency determined by the desired rational frequency;
   adjusting at least one of the sequences of numbers using the correction value; and
   outputting a resulting sequence of numbers at a second frequency determined by a quantitative value.

32. The method of claim 31 wherein the correction value is generated periodically based on a frequency that is determined using the desired rational frequency.

33. The method of claim 31 wherein the sequence of numbers, the correction value and the at least one of the sequences of numbers are generated during each of the plurality of cycles of operation.

34. The method of claim 31 further comprising:
   generating programming information using the desired rational frequency; and
   programming the NCO with the programming information.

35. The method of claim 34 wherein the desired rational frequency is represented by C/B and wherein the generating of programming information is performed using the equation $$\frac{C}{B} = \frac{\operatorname{int}\left(\frac{2^N * C}{B}\right)}{2^N} + \frac{\operatorname{rem}\left(\frac{2^N * C}{B}\right)}{2^N} = \frac{X}{2^N} + \frac{\left(\frac{Y}{B}\right)}{2^N}.$$

36. The method of claim 31 wherein generating a sequence of numbers comprises accumulating a first number.

37. The method of claim 36 wherein generating a correction value comprises accumulating a second number, comparing an accumulation result with a third number, and outputting the correction value when an overflow occurs.

38. The method of claim 31 wherein adjusting the at least one of the sequence of numbers comprises adding the correction value to the at least one of the sequence of numbers.

39. A method of operating a numerically controlled oscillator (NCO) comprising:
   generating an overflow value at a first frequency determined by a first quantitative value; and
   generating a desired frequency determined by a second quantitative value using the overflow value.

40. The method of claim 39 wherein the generating an overflow value occurs at a frequency determined using a desired rational frequency.

41. The method of claim 40 wherein generating the desired rational frequency is performed using an accumulation value.

42. The method of claim 41 wherein the desired rational frequency is represented by C/B, and wherein the frequency and the accumulation value are determined using the following equation $$\frac{C}{B} = \frac{\operatorname{int}\left(\frac{2^N * C}{B}\right)}{2^N} + \frac{\operatorname{rem}\left(\frac{2^N * C}{B}\right)}{2^N} = \frac{X}{2^N} + \frac{\left(\frac{Y}{B}\right)}{2^N}.$$

43. The method of claim 42 wherein the accumulation value is represented by the value X, and the frequency is represented by Y/B.

44. A numerically controlled oscillator (NCO) system comprising:
   first NOC circuitry that generates an overflow value, the first NCO circuitry being programmed with first information calculated using a desired rational frequency of the system; and
   second NCO circuitry that generates a sequence of numbers, adds the overflow value from the first NCO circuitry to at least one of the sequence of numbers, and outputs a resulting sequence of numbers, the second NCO circuitry being programmed with second information calculated using the desired rational frequency of the system, and wherein the second NCO circuitry uses the second information and the overflow value to generate the desired rational frequency of the system, the desired rational frequency being represented by C/B and wherein the first and second information is determined using the equation $$\frac{C}{B} = \frac{\operatorname{int}\left(\frac{2^N * C}{B}\right)}{2^N} + \frac{\operatorname{rem}\left(\frac{2^N * C}{B}\right)}{2^N} = \frac{X}{2^N} + \frac{\left(\frac{Y}{B}\right)}{2^N}.$$

45. The NCO system of claim 44 wherein the first information comprises values for Y and B.

46. The NCO system of claim 44 wherein the second information comprises a value for X.

47. A numerically controlled oscillator (NCO) system comprising:
   first NCO circuitry that accumulates a first input value and generates an overflow value when an accumulation result is greater than a second input value; and
   second NCO circuitry that generates a sequence of numbers, adds the overflow value from the first NCO circuitry to at least one of the sequence of numbers, and outputs a resulting sequence of numbers.

48. The NCO system of claim 47 wherein the second NCO circuitry accumulates a third input value, and outputs a 0 or a 1 when a combination of an accumulation result and the overflow value itself results in an overflow.

49. A numerically controlled oscillator (NCO) system comprising:
   a first NCO that generates a correction value based on a desired rational frequency and is programmed with first information calculated using the desired rational frequency; and
   a second NCO that generates the desired rational frequency using the correction value, is programmed with second information calculated using the desired rational frequency, and uses the second information and the correction value to generate the desired rational frequency, the desired rational frequency being represented by C/B and wherein the first and second information is determined using the equation $$\frac{C}{B} = \frac{\operatorname{int}\left(\frac{2^N * C}{B}\right)}{2^N} + \frac{\operatorname{rem}\left(\frac{2^N * C}{B}\right)}{2^N} = \frac{X}{2^N} + \frac{\left(\frac{Y}{B}\right)}{2^N}.$$

50. The NCO system of claim 49 wherein the first information comprises values for Y and B.

51. The NCO system of claim 49 wherein the second information comprises a value for X.

52. A numerically controlled oscillator (NCO) system comprising:
   a first NCO that accumulates a first input value and generates a correction value based on a desired rational frequency when an accumulation result is greater than a second input value; and
   a second NCO that generates the desired rational frequency using the correction value.

53. The NCO system of claim 44 wherein the second NCO circuitry outputs a 0 or a 1 when a combination of an accumulation result and the overflow value itself results in an overflow.

54. A method of operating a numerically controlled oscillator (NCO) comprising:
   generating a sequence of numbers based on a desired rational frequency;
   generating a correction value based on the desired rational frequency;
   adjusting at least one of the sequences of numbers using the correction value;
   outputting a resulting sequence of numbers;
   generating programming information using the desired rational frequency; and
   programming the NCO with the programming information, the desired rational frequency being represented by C/B and wherein the generating of programming information is performed using the equation $$\frac{C}{B} = \frac{\operatorname{int}\left(\frac{2^N * C}{B}\right)}{2^N} + \frac{\operatorname{rem}\left(\frac{2^N * C}{B}\right)}{2^N} = \frac{X}{2^N} + \frac{\left(\frac{Y}{B}\right)}{2^N}.$$

55. A method of operating a numerically controlled oscillator (NCO) comprising:
   generating a sequence of numbers based on a desired rational frequency by accumulating a first number;
   generating a correction value based on the desired rational frequency by accumulating a second number, comparing an accumulation result with a third number, and outputting the correction value when an overflow occurs;
   adjusting at least one of the sequences of numbers using the correction value; and
   outputting a resulting sequence of numbers.

56. A method of operating a numerically controlled oscillator (NCO) comprising:
   generating an overflow value based on a desired rational frequency at a frequency determined using the desired rational value; and
   generating the desired rational frequency using the overflow value and an accumulation value, the desired rational frequency being represented by C/B, and wherein the frequency and the accumulation value are determined using the following equation $$\frac{C}{B} = \frac{\text{int}\left(\frac{2^N * C}{B}\right)}{2^N} + \frac{\text{rem}\left(\frac{2^N * C}{B}\right)}{2^N} = \frac{X}{2^N} + \frac{\left(\frac{Y}{B}\right)}{2^N}.$$

57. The method of claim 56 wherein the accumulation value is represented by the value X, and the frequency is represented by Y/B.

* * * * *